United States Patent
Lysen

(10) Patent No.: US 7,312,864 B2
(45) Date of Patent: Dec. 25, 2007

(54) MEASUREMENT DEVICE AND PROCESS FOR DETERMINING THE STRAIGHTNESS OF HOLLOW CYLINDRICAL OR HOLLOW CONICAL BODIES AND THEIR ORIENTATION RELATIVE TO ONE ANOTHER

(75) Inventor: Heinrich Lysen, Garching (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 258 days.

(21) Appl. No.: 11/110,724

(22) Filed: Apr. 21, 2005

(65) Prior Publication Data

US 2005/0237516 A1    Oct. 27, 2005

(30) Foreign Application Priority Data

Apr. 23, 2004   (DE) .................. 10 2004 020 406

(51) Int. Cl.
*G01B 11/26* (2006.01)
*G01B 11/00* (2006.01)

(52) U.S. Cl. ..................... 356/153; 356/399
(58) Field of Classification Search ............. None
See application file for complete search history.

(56) References Cited

U.S. PATENT DOCUMENTS

| | | | |
|---|---|---|---|
| 3,599,336 A * | 8/1971 | Walsh | 33/286 |
| 3,907,435 A * | 9/1975 | Roodvoets | 356/153 |
| 4,243,877 A * | 1/1981 | Cruz | 250/206.2 |
| 4,346,993 A * | 8/1982 | Trost et al. | 356/138 |
| 4,518,855 A | 5/1985 | Malak | |
| 4,830,491 A * | 5/1989 | Grace | 356/241.1 |
| 5,461,793 A * | 10/1995 | Melville | 33/286 |
| 5,529,437 A * | 6/1996 | Filipowski et al. | 405/143 |
| 5,621,531 A * | 4/1997 | Van Andel et al. | 356/399 |
| 5,717,491 A | 2/1998 | Busch et al. | |
| 6,266,143 B1 * | 7/2001 | Peterson et al. | 356/399 |
| 6,342,946 B1 | 1/2002 | Holstein | |
| 6,516,533 B1 | 2/2003 | Hermann | |
| 6,609,305 B2 | 8/2003 | Lysen | |
| 6,708,416 B1 * | 3/2004 | Havens et al. | 33/366.24 |
| 2004/0042010 A1 | 3/2004 | Wuestefeld | |

* cited by examiner

*Primary Examiner*—Michael P. Stafira
(74) *Attorney, Agent, or Firm*—David S. Safran

(57) ABSTRACT

Device for determining the straightness of hollow cylindrical surfaces and partial surfaces thereof, and the three-dimensional orientation of several hollow cylindrical surfaces or partial surfaces with reference to at least one of axial parallel offset and angular offset relative to one another. A transmitting/receiving device and a reflector/receiving device are provided which are swingable essentially without play over a respective hollow cylindrical surface or partial hollow cylindrical surface. The transmitting/receiving device has at least one transmitter for emitting light beams and at least one receiver for receiving and for measuring an incidence position of the light beams. The reflector/receiving device has at least one partially-reflective optical element for partial reflection of light beams and at least one receiver for receiving and for measuring an incidence position of a portion of the light beams. The relationship between circular lines produced on the detectors in different phases of measurement is used.

3 Claims, 4 Drawing Sheets

MEASUREMENT DEVICE AND PROCESS FOR DETERMINING THE STRAIGHTNESS OF HOLLOW CYLINDRICAL OR HOLLOW CONICAL BODIES AND THEIR ORIENTATION RELATIVE TO ONE ANOTHER

BACKGROUND OF THE INVENTION

1. Field of Invention

This invention relates to a device and a process for determination of the straightness on hollow cylindrical and/or hollow conical bodies, or also for the determination of the three-dimensional orientation (in azimuth and elevation) of several hollow cylindrical or hollow conical bodies relative to one another. The invention is also suited to determination of the orientation or straightness of hollow cylindrical sectors or partial surfaces. These bodies or partial surfaces can be found, for example, on plain bearing half liners, on turbine housings, or on ships.

2. Description of Related Art

A known device for determining the alignment of hollow cylindrical bodies is described in European Patent No. EP 0 543 971 and its counterpart U.S. Pat. No. 5,717,491. In it, a transmission device for sending a laser beam is mounted stationary relative to its surface. The light beam is emitted in the axial direction of the hollow cylinder. A respective sensor for detection of the light beam is turned in diverse positions along the hollow cylinder axis around exactly the latter, therefore in the tangential direction of the hollow cylinder or a partial surface thereof. Details of the device and the pertinent process can be found in the aforementioned patents. The transmission device should not be pushed or displaced during the measurement.

Another device for determining the alignment of hollow cylindrical bodies relative to a three-dimensional stationary reference axis is known from published German Patent Application DE 199 47 292 and its counterpart U.S. Pat. No. 6,516,533. However, precision-operating devices of this type are, at present, comparatively expensive. Moreover, these devices can only determine the angular orientation of hollow cylinders relative to reference directions, but not the pertinent translational offset amounts.

Another device for determining the alignment of hollow cylindrical bodies relative to a reference surface which is stationary in space is known from DE 199 43 502 and corresponding U.S. Pat. No. 6,342,946. This device is intended for completely hollow cylindrical surfaces and requires a receiving surface which is mounted outside of these hollow cylindrical surfaces.

SUMMARY OF THE INVENTION

The primary object of the present invention is to reduce or eliminate the disadvantages or limitations of the known prior art.

This object is achieved by a device which is suited for determining the straightness of hollow cylindrical surfaces or partial surfaces thereof, or for determining the three-dimensional orientation of several hollow cylindrical surfaces or partial surfaces with reference to the axial parallel offset and/or angular offset relative to one another, the device being equipped with:

a transmitting/receiving device which can be swung essentially without play over a hollow cylindrical surface or partial hollow cylindrical surface, for sending and receiving light beams, which is equipped with an attachment device or unrolling device on a respective housing and has at least one transmitter for emitting parallel or diverging light beams and at least one receiver for receiving and for measuring the incidence position of light beams of this type and being equipped with a reflector/receiving device which can be swung essentially without play over a hollow cylindrical surface or partial hollow cylindrical surface for receiving and reflecting light beams of the indicated type, which is equipped with an attachment device or unrolling device on the respective housing and has at least one partially-reflective optical element for partial reflection of light beams of the indicated type and at least one receiver for receiving and for measuring the incidence position of a portion of the light beams of the indicated type.

The device in accordance with the invention is advantageously used by in accordance with the process of the invention which is typically carried out by the steps of:

first, placing a transmitting/receiving device and a reflector/receiving device on the hollow-side partial surfaces which are to be measured such that the respective surfaces of a light exit opening and of a reflector are facing one another;

in a second step, the transmitting/receiving device is swung essentially without play in the tangential direction along the respective hollow-side partial surface; on the one hand, the location or position parameters of the light beams which are incident on the first optoelectronically acting receiving surface are continuously detected and processed or stored, preferably as a function of the rotary angle position of the transmitting/receiving device, based on the data which have been acquired in this way, the location of a first circle center quantity relative to the housing being determined, and on the other hand, at the same time, the location or position parameters of the light beams which are reflected onto the second optoelectronically acting receiving surface are continuously detected and processed or stored preferably as a function of the rotary angle position of the transmitting/receiving device, based on the data which have been acquired in this way the location of the second circle center relative to the housing being determined;

in a third step, the reflector/receiving device is swung essentially without play in the tangential direction along the respective hollow-side partial surface; on the one hand, the location or position parameters of the light beams which are incident on the first optoelectronically acting receiving surface are continuously detected and processed or stored, preferably as a function of the rotary angle position of the receiving surface, based on the data which have been acquired in this way, the location of the third circle center relative to the housing being determined, and on the other hand, at the same time, the location or position parameters of the light beams which are reflected onto the second optoelectronically acting receiving surface are continuously detected and processed or stored as a function of the rotary angle position of the first receiving surface, and based on the data which have been acquired in this way, the location of a fourth circle center relative to the housing is determined in a fourth step, using the determined values of the coordinates of the centers of the circles the parallel offset (in the horizontal and vertical direction) of the longitudinal axes ("cores") assigned to the individual hollow cylindrical and hollow conical partial surfaces is computed in a fifth step, using the determined values of the coordinates of the centers of the circles the angular offset (in azimuth and elevation) of the longitudinal axes ("cores") assigned to the individual hollow cylindrical and hollow conical partial surfaces is computed.

The optoelectronic sensors used in accordance with the invention for detection of the incidence point of the light beam are known according to the current art and can be, for example, position-sensing diodes, or pixel-oriented image detectors. The invention uses known mathematical processes in the determination of the center points of the circles and the respective radii. These processes can also, in general, be those which determine the parameters of conic sections. The indicated processes can accept angle information with respect to the turning angle of a sensor (around the pertinent hollow cylinder axis) in the computation process. If the required data acquisition of the light incidence position takes place in more than three rotary positions of the transmitting or receiving device, determination and computation of these angles of rotation can optionally be abandoned. Typically these mathematical processes also contain methods of "best fits", i.e., the determination of optimum values using computation standards from the field of statistics or numerical filtration and smoothing.

In the determination of the indicated circle parameters, according to the invention, a further improved result can be achieved. In particular, since, in the measurement phases on the two detectors, circular lines are produced and can be observed at the same time, it is possible to study and use the fact that these circular lines are related to one another. For example, the arc lengths of the corresponding, i.e., reflected arcs (in degrees or radians) must be identical, and the respective radii must have a constant quotient. For this reason, a coupled compensation computation can be undertaken with the data of two separately detected arcs.

It is especially advantageous that, to detect the desired measured values, it is simply necessary to carry out a first swinging motion of the transmitting/receiving device followed by a second swinging motion of the reflector/receiving device.

For detection of the alignment of hollow conical surfaces relative to one another, or of a hollow conical surface relative to a hollow cylindrical surface, it can be necessary to provide special adapters which move the transmitting/receiving device and the reflector/receiving device into the vicinity of the hollow cone axes or hollow cylinder axes.

Both the transmitting/receiving device and also the reflector/receiving device are preferably powered by means of batteries, but there can also be power supply by means of corresponding external power packs. The data detected is optionally preprocessed by the transmitting/receiving device and also by the reflector/receiving device by means of installed electronics are preferably transmitted to a higher-level data processing device, either wirelessly or via suitable data cables. The measurement results of interest are computed and displayed, preferably by means of the indicated data processing device which can be, for example, a portable computer or a so-called PDA (personal data assistant) together with the pertinent software.

The invention is explained in further detail below using the accompanying drawings.

DETAILED DESCRIPTION OF THE INVENTION

Figure 1:
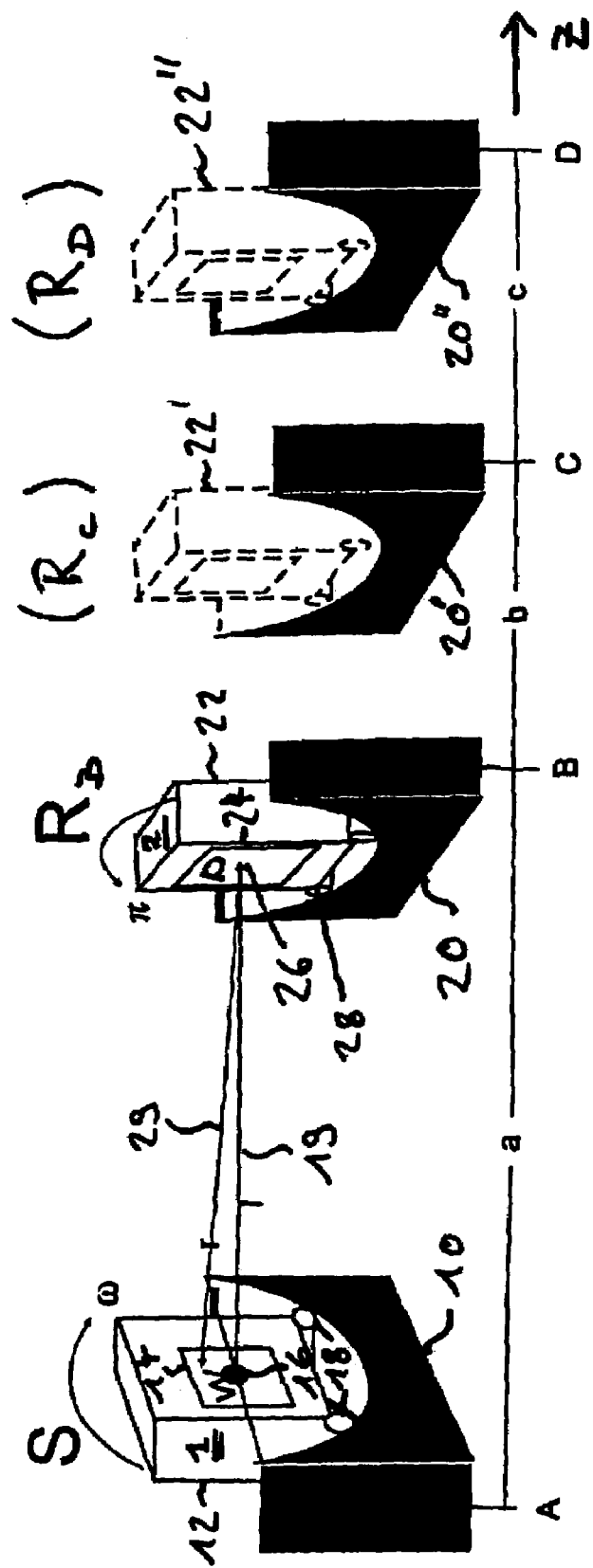
FIG. 1 is a perspective diagram of the transmitting/receiving device and reflector/receiving device in different measurement positions of different partial hollow cylinder surfaces which are to be measured.

As shown in FIG. 1 in schematic form, the alignment and/or the straightness of hollow cylindrical surfaces or partial surfaces 10, 20, 20', 20" is undertaken by means of a transmitting/receiving device "S" (reference number 12) and a reflector/receiving device "R" (reference number 22). The hollow cylindrical surfaces or partial surfaces (hereinafter, in general, also called "hollow cylinders") can be continuous, or can be arranged in sections in the axial direction of the hollow cylinder, as is shown in FIG. 1. The transmitting/receiving device S and the reflector/receiving device R are arranged at a distance "a" from one another in the axial direction. The axial direction of the hollow cylindrical surface or surfaces is called the z-direction here.

Both the transmitting/receiving device and also the reflector/receiving device are equipped with mounting or rolling devices 18, 28, so that they can be swung essentially without play over the hollow surfaces which are to be measured, around the respective longitudinal axes of these surfaces. For this purpose, it is advantageous to provide mounting devices which act in the manner of permanent magnets. If necessary, there can also be rollers so that swinging motion can be carried out with less friction. The swinging angle (arrow of rotation ω) can in principle be stipulated to be almost arbitrary, but for practical reasons should not be less than a value of 20°.

The transmitting/receiving device has both a device 16 which emits light beams 19, and also an optoelectronically acting receiving surface 14 which is suited for reception of reflected light beams 29.

The reflector/receiving device 22 which is located first in the measurement position "B" can likewise be swung there around the lengthwise axis of the hollow cylinder 20 (swinging angle π). The reflector/receiving device 22 likewise has an optoelectronically working receiving surface 24. Instead of a device which actively emits light beams, there is a partially reflecting surface (semitransparent mirror) 26. It is located in front of the receiving surface 24 and reflects part of the light which is incident there, the remainder of the light traveling to the receiving surface 24.

To measure the orientation of the hollow cylinders 10, 20' relative to one another, the reflector/receiving device is mounted in position "C". In this position, the two swinging movements by the angle of rotation ω or π are carried out in succession. The same applies to the measurement of the hollow cylinders 10, 20" in measurement positions "A" and "D", etc.

Figure 2:
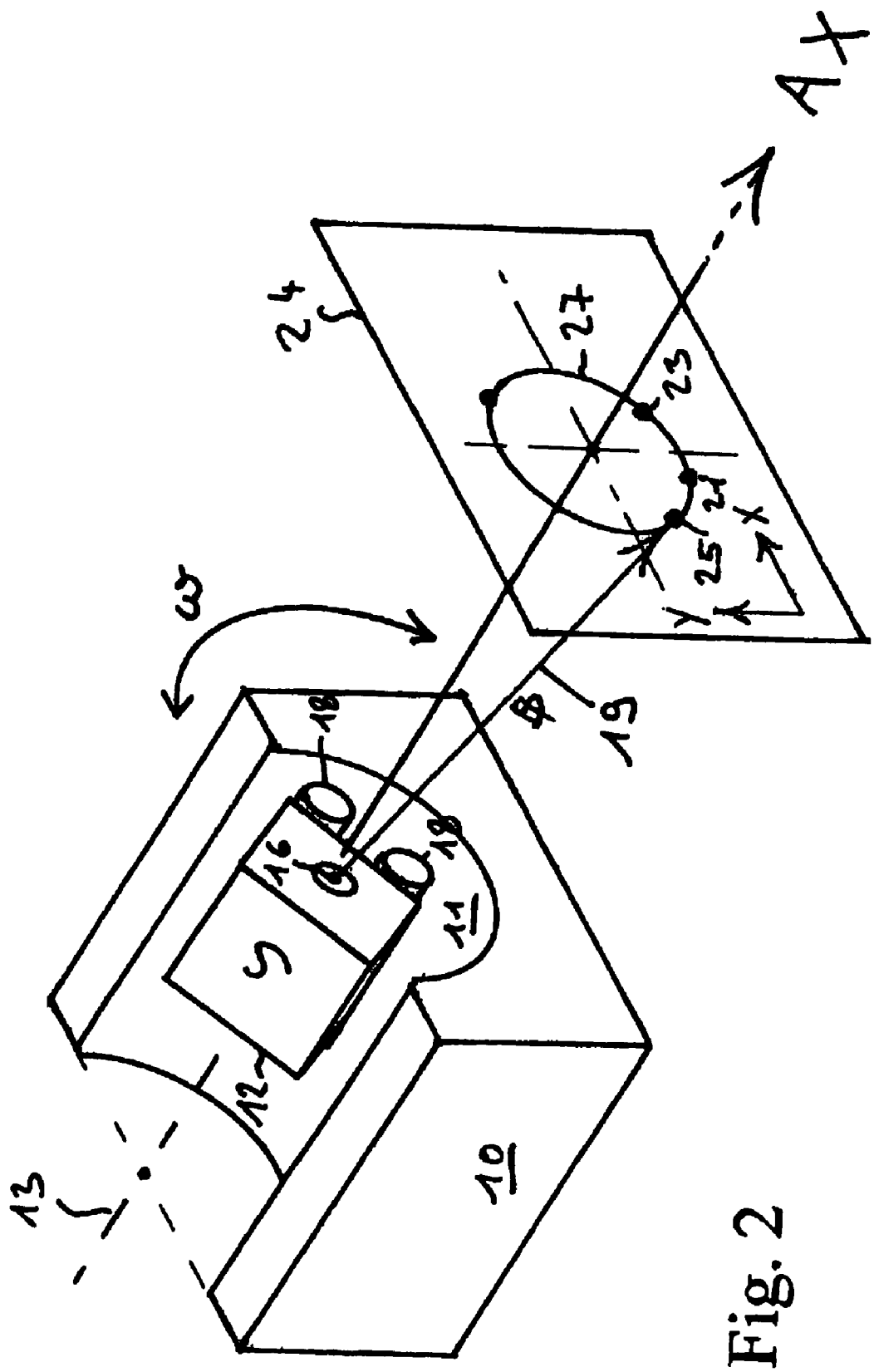
FIG. 2 shows the geometrical relationships for the incidence of a light beam on a first receiving surface with tangential displacement of the transmitting device around the respective longitudinal axis of the hollow cylinder.

FIG. 2 shows how, when the transmitting/receiving device is swung (angle of rotation ω) within the hollow cylinder 10 around its lengthwise axis ("core") 13, the light emitting device 16 (preferably a laser light transmitter) defines a surface in space which is represented, in an ideal case, by a single line, but in practice, due to production inaccuracies, is more or less shaped like the envelope of a cone. (The indicated shape of the envelope of a cone or parts of it are mathematically exactly the surface of a hyperboloid; this can be taken into account for especially accurate computations). Therefore, a circle 27 with a center 150 and a radius 151 is traced on the receiving surface 24 which is opposite the light emitting device 24 when the transmitting/receiving device is swung as shown in FIG. 2. Compare the points 21, 23, 25 which are shown there and which define the parameters of this circle within and relative to the origin of the x-y coordinate system shown there, which is permanently assigned to the receiving surface 24. It is able to sense the location of a light spot which is incident there, for example 25, according to the indicated x and y coordinates and by means of electrical signals to transmit it to a higher-level evaluation means. As is apparent, the center 150 of the circle 27 thus defines the penetration point of the lengthwise axis 13 on the receiving surface 24.

Figure 3:
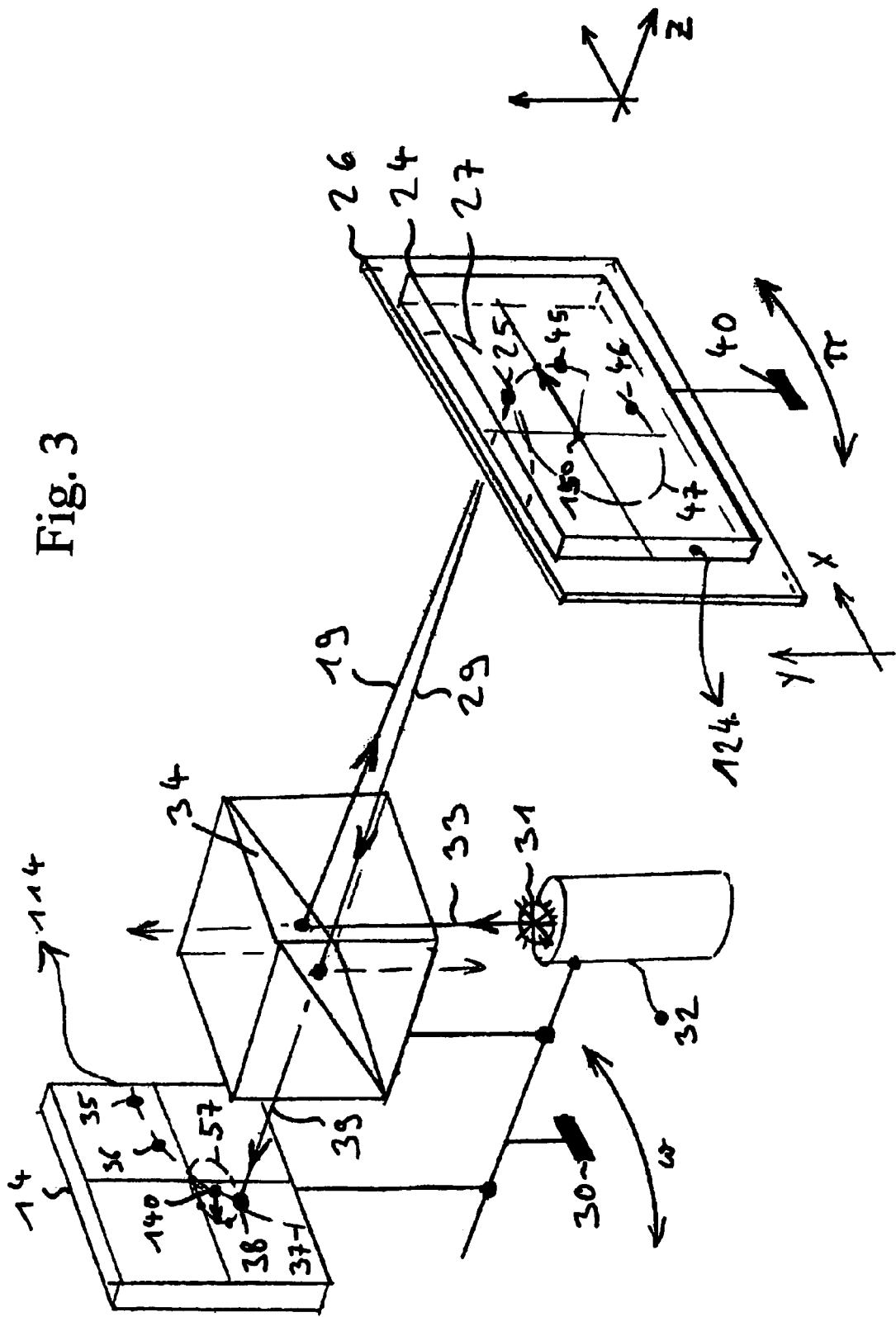
FIG. 3 shows the geometrical relationships for the incident and reflected light beams onto the first and second receiving surfaces and the location of the four pertinent arcs.

According to the invention, to determine the parallel offset and angular offset of two hollow cylinders, the parameters of 4 circles must be determined, as is shown in FIG. 3. In the left half of FIG. 3, the important components of the transmitting/receiving device can be seen, specifically a light source 31 (preferably a laser light source) which emits a light beam 33 which is partially reflected on a beam splitter 34 and then is sent as a light beam 19 in the direction of the receiving surface 24, and then, to the receiving surface 14 and its electrical or signal connection 114.

The light source 31, the beam splitter 34 and the receiving surface 14 are mounted so as to be stationary relative to the surrounding housing 12 (in FIG. 3 symbolized with reference number 30) and relative to one another. In the right half of F*igure* 31, the receiving surface 24 together with the upstream partially reflecting optical element (semitransparent mirror) 26, the permanently assigned x-y coordinate system there, and the pertinent electrical or signal connection 124 are shown (the housing 20 being identified with reference number 40). The illustrated light incidence point 25, when the transmitting/receiving device is swung by the angle of rotation ω, is guided on a circular path 27; compare FIG. 2. The determination of the parameters (location of the center and radius) of the circle 27 yields a first pair of values for computing the alignment and orientation of the hollow cylinders 10, 20 (or 20', 20) relative to one another. However, in addition, the pairs of values of three other circles must be determined for this computation, as is explained below.

When the reflector/receiving device is stationary, as already mentioned, some of the light beam 19 is reflected as a light beam 29, passes through the beam splitter 34 and is proportionally incident as a beam 39 on the receiving surface 14 of the transmitting/receiving device. The incidence point there is identified with reference number 38.

When the transmitting/receiving device is swung around the core of the hollow cylinder 10 with the reflector/receiving device stationary, therefore not only is the arc 27 drawn on the receiving surface 24, but a corresponding reflected circle 37 also appears in enlarged form on the receiving surface 14 of the transmitting/receiving device. It is clear that the reflected circle 37 must have roughly twice the diameter compared to the circle 27. In this case, it also applies that, by determining the position of only 3 incidence points, for example, 35, 36 and 38, the parameters of the circle 37 can be completely determined relative to the x-y coordinate system of the receiving surface 14.

To determine the parameters of two more required circles, the procedure is as follows:

With the transmitting/receiving device stationary, in a following step, the reflector/receiving device is then also swung around the lengthwise axis of the hollow cylinder which is to be measured there (arrow of rotation π). This then causes, on the one hand, the generation of the circle 47 on the receiving surface 24, for example, with the illustrated incidence points 25, 45 and 46 which define the pertinent center 152 together with the radius 153. It goes without saying that in this, and also in the other cases, the measurement of additional incidence points is beneficial since, by using methods of compensation computation and best fits, a more precise definition of the center and radius is possible. On the other hand, when the reflector/receiving device swings, at the same time, a circle 57, even if small, is drawn on the receiving surface 14 since, in this case, the partially reflecting mirror 26 also reflects back part of the light which is incident there. If the surface normal of the partially reflecting mirror 26 were aligned exactly parallel to the lengthwise axis of the hollow cylinder 20, the reflection conditions for the incidence points 25, 45 and 46 would be identical and the reflected beam 29 would not change its position during the swinging motion π. Depending on the magnitude of the production-induced deviations from this ideal state, thus, a more or less large circle 57 results on the receiving surface 14 which has center point coordinates 140 which finally complete the required measurement data.

Figure 4:
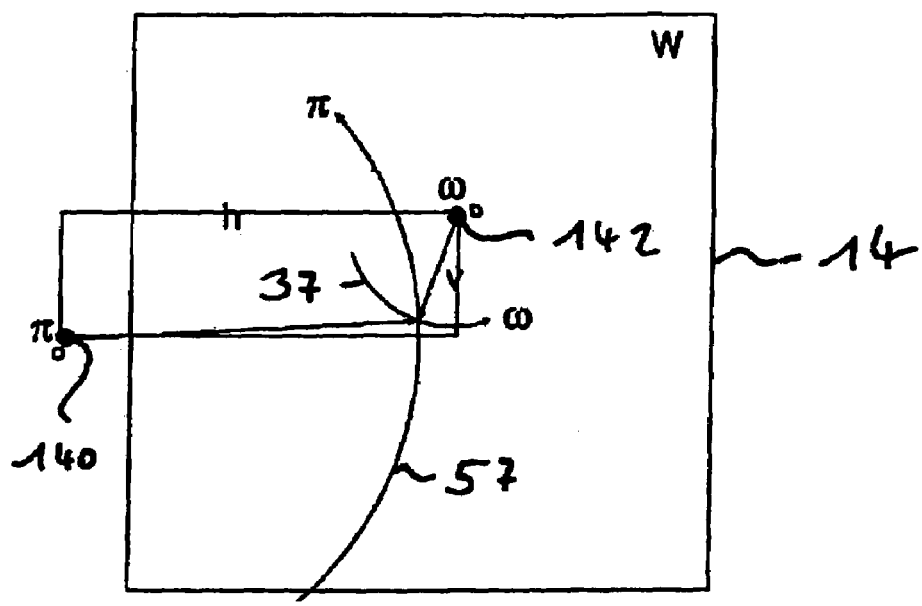
FIG. 4 shows the location of the centers and radii of arcs of interest on the sensor or the receiving surface of the transmitting/receiving device.
Figure 5:
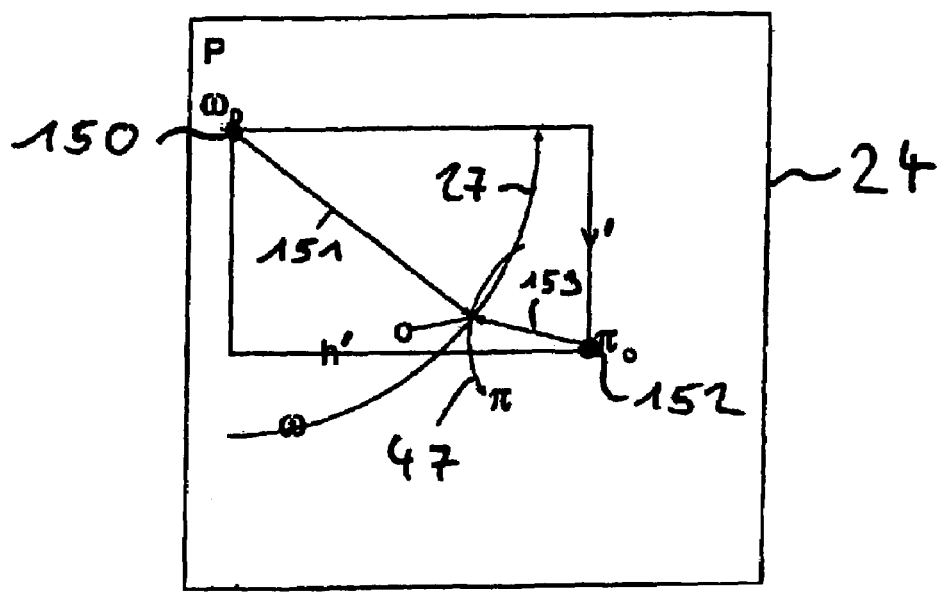
FIG. 5 shows the location of the centers and radii of arcs of interest on the sensor or the receiving surface of the reflector/receiving device.

The corresponding geometrical relationships are shown in FIGS. 4 & 5 in which FIG. 4 represents the circles and their importance on the receiving surface 14, while FIG. 5 shows the circles and their relation to one another on the receiving surface 24 of the reflector/receiving device.

As soon as the location of the respective circle centers has been determined based on the observed arcs on the receiving surfaces 14, 24 (these circle centers can be located entirely outside of the receiving surfaces), as shown in FIG. 4, the sum of the horizontal projections "h" as a measure of the horizontal (azimuth) angle deviation of the hollow cylinders and the sum of the vertical projections "v" as a direct measure for the vertical (elevation) angle deviation of the hollow cylinders are known. At the same time, as shown in FIG. 5, with the sum of the horizontal projections h', the horizontal parallel offset of the sensors and the respective hollow cylinders is known, while the sum of the vertical projections v' reveals the vertical parallel offset of the hollow cylinders involved.

It is advantageous to equip the transmitting/receiving device and the reflector/receiving device each with electronic inclinometers in order to be able to give defined angle sizes of the housing relative to the vertical or horizontal.

As noted above, both the transmitting/receiving device and also the reflector/receiving device are preferably powered by means of batteries, but instead they can also be powered by means of corresponding external power packs. The data detected are optionally preprocessed by the transmitting/receiving device and also by the reflector/receiving device by means of installed electronics and are preferably transmitted to a higher-level data processing device, either wirelessly or via suitable data cables. The measurement results of interest are computed and displayed, preferably by means of the indicated data processing device which can be, for example, a portable computer or a so-called PDA (personal data assistant) together with the pertinent software.

What is claimed is:

1. Device for determining the straightness of hollow cylindrical surfaces and partial surfaces thereof, and the three-dimensional orientation of several hollow cylindrical surfaces or partial surfaces with reference to at least one of axial parallel offset and angular offset relative to one another, comprising:
   a transmitting/receiving device having at least one transmitter for emitting light beams and at least one receiver for receiving and for measuring an incidence position of the light beams, the transmitting/receiving device being fixed within a housing which is tangentially swingable essentially without play over a hollow cylindrical surface or partial hollow cylindrical surface, the housing being equipped with an attachment device or rolling device;
   a reflector/receiving device having at least one partially-reflective optical element for partial reflection of light beams and a second at least one receiver for receiving and for measuring an incidence position of a portion of the light beams, the reflector/receiving device being fixed within a housing which is swingable essentially without play over a hollow cylindrical surface or partial hollow cylindrical surface the housing of the reflector/receiving device being equipped with an attachment device or rolling device.

2. Device as claimed in claim 1, wherein at least one of the transmitting/receiving device and the reflector/receiving device is provided with electronic inclinometers for electronically detecting and reading out the angular position of the housing.

3. Process for determining the straightness of hollow cylindrical surfaces and partial surfaces thereof, and the three-dimensional orientation of several hollow cylindrical surfaces or partial surfaces with reference to at least one of axial parallel offset and angular offset relative to one another, comprising the steps of:
   first, placing a transmitting/receiving device and a reflector/receiving device on hollow side partial surfaces which are to be measured such that the respective surfaces of a light exit opening of the transmitting/receiving device and of a reflector of the reflector/receiving device are facing one another;
   next, swinging the transmitting/receiving device essentially without play in a tangential direction along the respective hollow side partial surface while light beams are being emitted thereby parallel to a longitudinal axis of the hollow cylindrical surface or hollow side partial surface with location or position parameters of the light beams emitted by the transmitting/receiving device that are incident on a first optoelectronically acting receiving surface of the reflector/receiving device being continuously detected and processed or stored, as a function of the rotary angle position of the transmitting/receiving device, and based on the data which have been acquired in this way, the location of a first circle center quantity relative to a housing of the reflector/receiving device being determined, and at the same time, the location or position parameters of light beams which are reflected by the reflector onto a second optoelectronically acting receiving surface of the transmitting/receiving device are continuously detected and processed or stored as a function of the rotary angle position of the transmitting/receiving device, and based on the data which have been acquired in this way, the location of a second circle center relative to a housing of the transmitting/receiving device being determined;
   third, swinging the reflector/receiving device essentially without play in the tangential direction along the respective hollow cylindrical surface or hollow-side partial surface; the location or position parameters of the light beams which are incident on the first optoelectronically acting receiving surface being continuously detected and processed or stored as a function of the rotary angle position of the receiving surface, and based on the data which have been acquired in this way, the location of a third circle center relative to the housing of the reflector/receiving device being determined, and at the same time, the location or position parameters of the light beams which are reflected onto the second optoelectronically acting receiving surface are continuously detected and processed or stored as a function of the rotary angle position of the first receiving surface, and based on the data which have been acquired in this way, the location of a fourth circle center relative to the housing is determined
   next, using the determined values of the coordinates of the centers of the circles, determining the parallel offset of longitudinal axes assigned to the hollow cylindrical surface or hollow partial surfaces is computed
   fifth, using the determined values of the coordinates of the centers of the circles, the angular offset of the longitudinal axes assigned to the hollow cylindrical surface or hollow partial surfaces is computed.

* * * * *